Aug. 1, 1939.  H. J. KEITEL  2,168,215
HYDRAULIC TRANSMISSION SYSTEM
Filed July 23, 1936   2 Sheets-Sheet 2
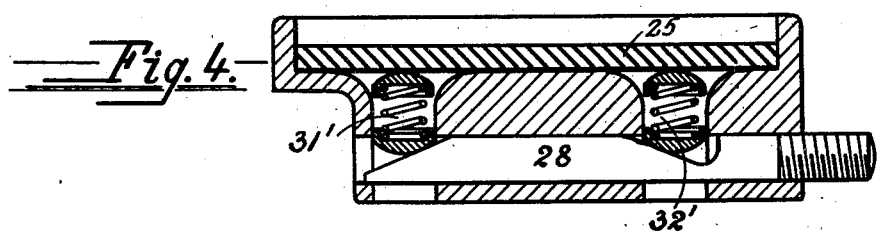
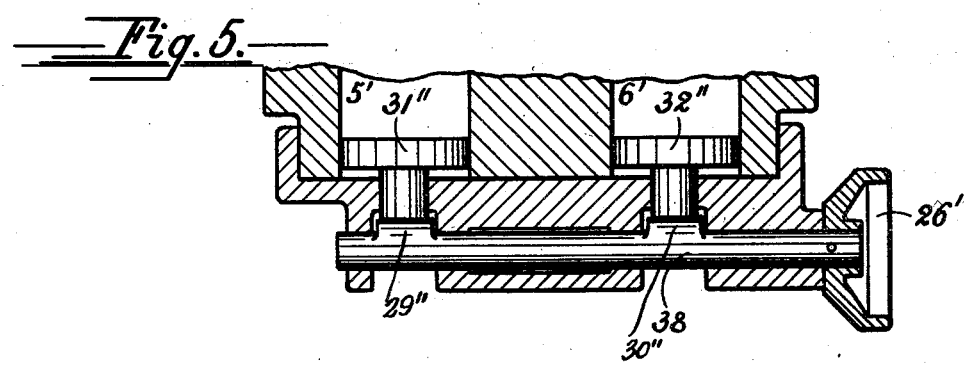
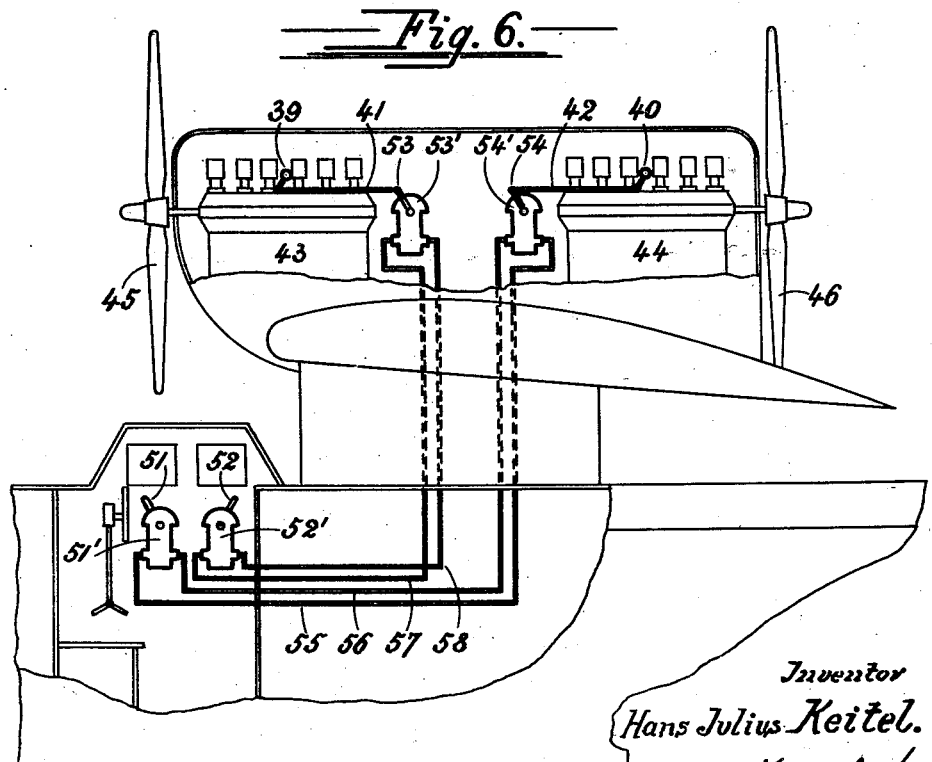
Inventor
Hans Julius Keitel.
per Karl A. May
Attorney.

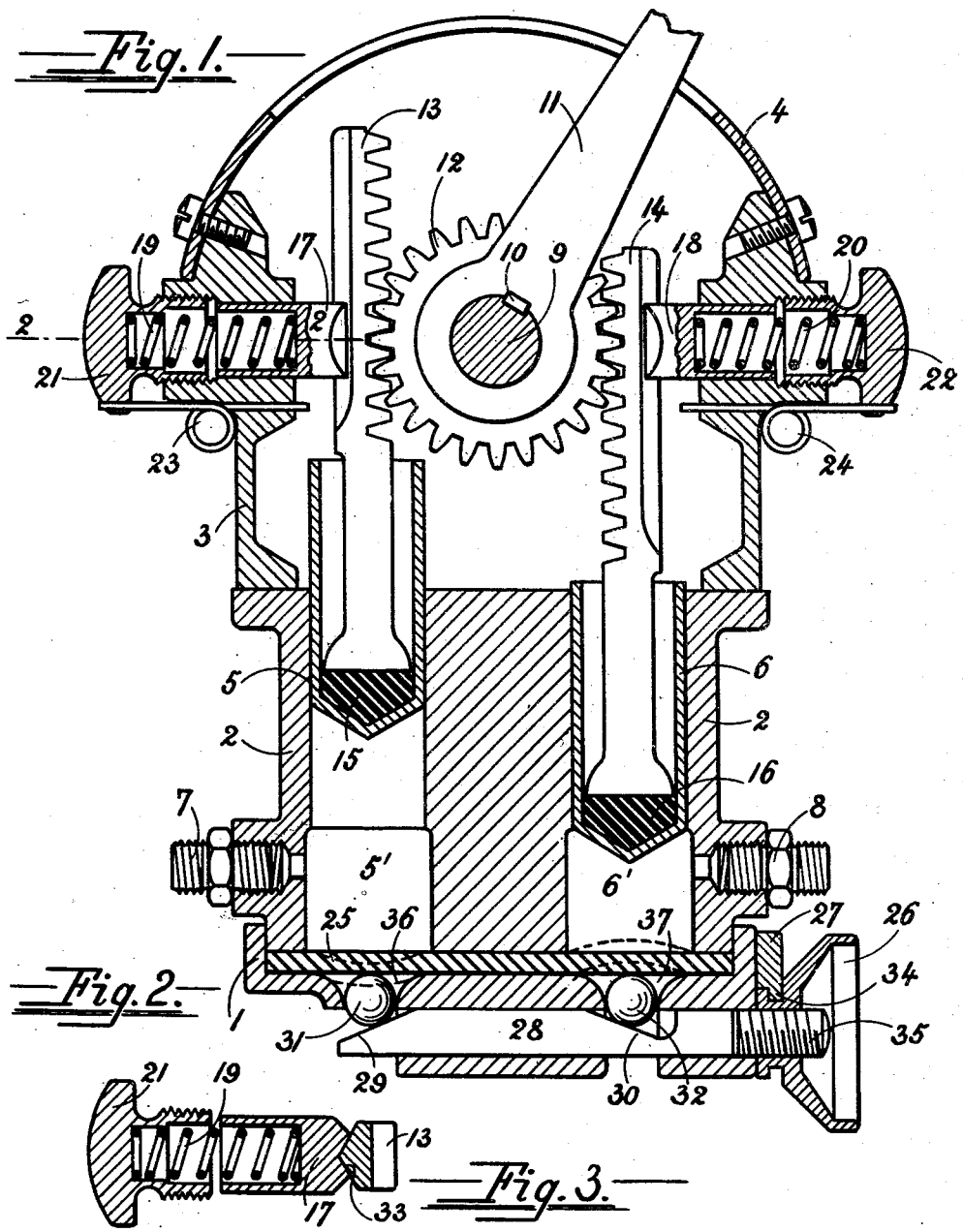

Patented Aug. 1, 1939

2,168,215

UNITED STATES PATENT OFFICE 2,168,215

HYDRAULIC TRANSMISSION SYSTEM

Hans Julius Keitel, Friedrichshafen-on-the-Bodensee, Germany, assignor to Dornier-Werke G. m. b. H., Friedrichshafen-on-the-Bodensee, Germany, a corporation Application July 23, 1936, Serial No. 92,176
In Germany August 1, 1935

12 Claims. (Cl. 60—54.6)

The present application relates to hydraulic control impulse transmission systems, more particularly to a sender and receiver for such systems as is particularly suitable for use on aircraft.

An object of the present invention is to provide an apparatus which can be used as sender as well as receiver of hydraulic control impulses.

A further object of the present invention resides in the provision of an apparatus of the type set forth having a plurality of pistons which are flexibly and resiliently connected with their respective piston rods.

Another object of this invention is the provision of an apparatus of the type set forth comprising rack and tooth wheel provisions, whereby the rack is adjustably and resiliently pressed to the tooth wheel.

A further object of this invention is to provide an apparatus of the type set forth having a plurality of cylinders, the ends of which are closed by flexible means.

Another object of the present invention resides in the provision of an apparatus of the type disclosed having a plurality of cylinders, the interior volume of which can be simultaneously changed.

Further and other objects of the present invention will be hereinafter set forth in the accompanying specification and claims and shown in the drawings which, by way of illustration, show what I now consider to be a preferred embodiment of my invention.

In the drawings:

Fig. 1 is a cross sectional showing of a hydraulic sending and receiving apparatus according to the present invention.

Fig. 2 is a cross sectional showing of a detail shown in Fig. 1 and taken along line 2—2 of Fig. 1.

Fig. 3 is a modification of the lower part of the apparatus shown in Fig. 1.

Fig. 4 is another modification of the lower part of the apparatus shown in Fig. 1.

Fig. 5 is another modification of the lower part of the apparatus shown in Fig. 1.

Fig. 6 is a diagrammatic showing of the application of my present invention to aircraft.

Like parts are designated by like numerals in all figures of the drawings.

The apparatus consists substantially of a closing plate 1, the pump body 2, the upper part 3, and the closing cap 4. In the pump body 2 are two operating cylinders which are parallel to one another and in which pistons 5 and 6 are movably arranged. 7 and 8 are the connections of tube lines with cylinders 5' and 6', respectively, which tube lines individually connect said cylinders with the cylinders of another like apparatus. The upper part 3 carries a shaft 9 to which a lever 11 is connected by means of key 10. If the apparatus serves as sender, lever 11 may be operated by hand; if it serves as receiver, the parts to be controlled are connected to lever 11, for example, when applied to aircraft, a rudder or the like. A tooth wheel 12 which engages the racks 13 and 14 is also keyed to shaft 9. These racks are only pressure transmittingly but not rigidly connected with pistons 5 and 6; for this purpose, filling members 15 and 16 made of rubber or the like are arranged between the lower ends of racks 13 and 14, respectively, and the pistons 5 and 6, respectively. The advantage of the use of such resilient filling members resides in the fact that minor inaccuracies in the assembly of the apparatus have no harmful influence on its operation and that the connection between piston and rack is easy and inexpensive to manufacture. The racks 13 and 14 are pressed to tooth wheel 12 by means of gliding members 17 and 18, respectively. One of these members, namely, member 17 is shown in another longitudinal section in Fig. 2. The end of the member is provided with a prismatic reset 33 into which the prismatic back portion of rack 13 fits so that member 17 cannot revolve. Members 17 and 18 are able to reciprocatingly move in the upper part 3. They are pressed towards the racks 13 and 14 by springs 19 and 20, the tension of which can be adjusted by manipulation of screws 21 and 22. These screws are prevented from undesired turning by means of locks 23 and 24. The gliding members 17 and 18 which are adjustingly pressed to racks 13 and 14 not only assure engagement of said racks with tooth wheel 12 but also act as brakes and prevent undesired motion of pistons 5 and 6.

In between the pump body 2 and the closing plate 1, a plate 25 made of rubber or another elastic material is arranged. This plate 25 closes the lower ends of cylinders 5' and 6' and can be deformed by manipulating nut 26 in such manner that the interior volume of both cylinders is simultaneously increased or decreased, if a member 28' is used according to Fig. 3, or so that the interior volume of one of the cylinders is increased and, at the same time, the volume of the other cylinder decreased, if a member 28 is used as shown in Fig. 1. Nut 26 in Fig. 1 is prevented from axial movement by cam 34 of member 27 which is fixed to plate 1. Member 28 is slidingly carried by means of plate 1 and has a screw extension 35 cooperating with nut 26; upon turning nut 26, member 28 is moved laterally; member 28 has two resets which comprise surfaces 29 and 30 which are inclined in opposite directions; plate 1 has two openings 36 and 37 which are opposite said resets and in which openings and resets balls 31 and 32 are situated. Upon lateral movement of member 28, for example to the right as seen in Fig. 1, ball 32 is forced upwards by the surface 30, whereas ball 31 is permitted to move downwards. Flexible plate 25, due to the pressure inside of cylinders 5' and 6' follows the movements of balls 31 and 32, and the interior volume of cylinder 5' is increased, whereas the volume of cylinder 6' is decreased. The deformations of plate 25 are indicated in dotted lines in Fig. 1. If member 28 moves to the left as seen in Fig. 1, the volume of cylinder 5' is decreased and that of cylinder 6' increased. Such additional operating means which, in fact, are used as adjusting means are desirable, for example, when the apparatus is used in connection with a control system as shown in Fig. 6. If sender 51' is provided with the adjusting means shown in Fig. 1 and member 28 is moved to the left, more operating liquid is forced into tube line 55 and liquid is permitted to flow from line 56 into the right cylinder of apparatus 51', whereby lever 54 is turned counterclockwise and the initial position of said lever and the throttle 40 connected thereto is changed accordingly. Of course, for normal operation of the throttle 40 lever 51 is operated. Nut 26 is manipulated only for initially setting the position of lever 54 with respect to lever 51.

If the surfaces 29 and 30 are inclined in the same direction as are the surfaces 29' and 30' of member 28' shown in Fig. 3, then the volume of both cylinders 5' and 6' is increased or decreased simultaneously upon lateral movement of part 28'. Such an adjustment is desirable, for example, when there is too much clearance between the racks 13 and 14 and the wheel 12. By movement of member 28' to the left, the gear is tightened up and the degree of tightening can be adjusted very finely.

If resilient members 31' and 32' as shown in Fig. 4 are arranged in between plate 25 and member 28, the resilient closures of cylinders 5' and 6' act as safety means against undesired high pressures in the interior of the hydraulic transmission systems. For example, if there is an excess pressure in the tube line connected to nipple 7, then elastic plate 25 is depressed against the action of spring 31' and no great damage can be done by the excess pressure.

Instead of the elastic plate 25, pistons 31'' and 32'' may be arranged which are guided in the operating cylinders 5' and 6', and the position of which pistons can be adjusted by turning a cam shaft 38 by means of the hand wheel 26' as is shown in Fig. 5. According to the configuration and position of cams 29'' and 30'' with respect to shaft 38, these cams act as the inclined surfaces 29 and 30 in Fig. 1 or 29' and 30' in Fig. 3.

Fig. 6 diagrammatically shows my invention as described in the foregoing paragraphs and as used in aircraft for controlling the gas supply control levers 39 and 40 of the engines 43 and 44 driving propellers 45 and 46. The levers 51 and 52 correspond to lever 11 in Fig. 1 and are manipulated by the operator of the plane. From the hydraulic senders 51' and 52', pipe lines 55 and 56 and 57 and 58 lead to the hydraulic receivers 54' and 53', respectively. These pipe lines correspond to the pipe lines connected to nipples 7 and 8 in Fig. 1. Upon operation of, for example, lever 51 of sender 51', lever 54 of receiver 54', which also corresponds to lever 11 in Fig. 1, makes the same movement as lever 51 and, by means of connecting rod 42, adjusts the gas control lever 40; upon movement of lever 52 of sender 52', lever 53 of receiver 53' makes the same movement as lever 52 and adjusts gas supply lever 39 which is connected to lever 53 by means of connecting rod 41.

While I believe the above described embodiments of my invention to be preferred embodiments, I wish it to be understood that I do not desire to be limited to the exact details of design and construction shown and described, for obvious modifications will occur to a person skilled in the art.

What I claim is:

1. A hydraulic control apparatus, comprising a plurality of operating cylinders made of rigid material, pistons made of rigid material within said cylinders, a tooth wheel and a plurality of racks engaging said tooth wheel, and connecting means made of rubber like material and interconnecting said racks and engaging said pistons, whereby said pistons are operated upon motion of said tooth wheel, and, due to said connecting means, minor, independent movements of said pistons are possible, and minor inaccuracies in the assembly of the apparatus remain without influence.

2. A hydraulic control apparatus, comprising a plurality of operating cylinders, pistons within said cylinders, a tooth wheel and a plurality of racks engaging said tooth wheel, said pistons having a cup-like configuration, and means made of yielding material and being situated inside said cup-like pistons and abuttingly cooperating therewith and being connected with said racks, whereby said pistons are operated upon motion of said tooth wheel, and, due to said yielding means, minor, independent movements of said pistons are permitted, and minor inaccuracies in the assembly of the apparatus remain without influence.

3. A hydraulic control apparatus comprising a plurality of operating cylinders, pistons within said cylinders, a tooth wheel and a plurality of racks engaging said tooth wheel and connected to and operating said pistons upon motion of said tooth wheel, and brake means resiliently and glidingly engaging said racks and being adapted to simultaneously press said racks to said tooth wheel, whereby a braking effect is also produced which prevents undesired movements of said racks in longitudinal direction and definite engagement of said racks and said tooth wheel is assured whereby undesired movement of said racks in a transverse direction is eliminated.

4. A hydraulic control apparatus comprising a plurality of operating cylinders which are hydraulically independent from one another, pistons within said cylinders, a tooth wheel, a plurality of racks engaging said tooth wheel and connected to and operating said pistons upon motion of said tooth wheel, a movable, adjustable closure at one end of each cylinder, and an operating means operatively connected with all of said closures and adapted to simultaneously move said closures, whereby the interior volume of said cylinders is changed.

5. A hydraulic control apparatus comprising a plurality of operating cylinders which are hydraulically independent from one another, pistons within said cylinders, a tooth wheel, a plurality of racks engaging said tooth wheel and connected to and operating said pistons upon motion of said tooth wheel, a movable, adjustable closure at one end of each cylinder, and an operating means operatively connected with all of said closures and adapted to simultaneously move all of said closures in the same direction, whereby the interior volume of all of said cylinders is changed in the same direction, i. e., increased and decreased.

6. A hydraulic control apparatus comprising a plurality of operating cylinders which are hydraulically independent from one another, pistons within said cylinders, a tooth wheel, a plurality of racks engaging said tooth wheel and connected to and operating said pistons upon motion of said tooth wheel, a movable, adjustable closure at one end of each cylinder, and an operating means operatively connected with all of said closures and adapted to simultaneously move some of said closures in one direction and the other closures in the opposite direction, whereby the interior volume of some of said cylinders is increased and the interior volume of the other some of said cylinders is decreased.

7. A hydraulic control apparatus comprising a plurality of operating cylinders which are hydraulically independent from one another, pistons within said cylinders, a tooth wheel, a plurality of racks engaging said tooth wheel and connected to and operating said pistons upon motion of said tooth wheel, a resilient closure at one end of each cylinder which yields to excessive pressures inside of said cylinders.

8. A hydraulic control apparatus comprising a plurality of operating cylinders which are hydraulically independent from one another, pistons within said cylinders, a tooth wheel, a plurality of racks engaging said tooth wheel and connected to and operating said pistons upon motion of said tooth wheel, and a movable, adjustable, and resilient closure at one end of each cylinder, by means of which closures the interior volume of said cylinders can be changed, and which closures yield to excessive pressures inside of said cylinders.

9. A hydraulic control apparatus comprising a plurality of operating cylinders which are hydraulically independent from one another, pistons within said cylinders, a tooth wheel, a plurality of racks engaging said tooth wheel and connected to and operating said pistons upon motion of said tooth wheel, and a yieldingly movable adjustable closure at one end of each cylinder, by means of which closures the interior volume of said cylinders can be changed.

10. A hydraulic control apparatus comprising a plurality of operating cylinders which are hydraulically independent from one another, pistons within said cylinders, a tooth wheel, a plurality of racks engaging said tooth wheel and connected to and operating said pistons upon motion of said tooth wheel, and a closing member common to a plurality of said cylinders and individually, movably and adjustably individually closing one end of each cylinder which is closed by said member, by means of which closure the interior volume of those of said cylinders which are closed by said member can be changed.

11. A hydraulic control apparatus comprising a pair of operating cylinders which are hydraulically independent from one another, a piston within each of said cylinders, a tooth wheel, a pair of racks engaging said tooth wheel and being individually connected to and operating said pistons upon motion of said tooth wheel, a movable adjustable closure at one end of each cylinder, and an operating means operatively connected with said closures and adapted to simultaneously move one of said closures in one direction and the other closure in the opposite direction, whereby the interior volume of one of said cylinders is increased and the interior volume of the other one of said cylinders is decreased.

12. A hydraulic control apparatus, comprising a plurality of operating cylinders, which are hydraulically independent from one another, pistons within said cylinders, a tooth wheel, a plurality of racks engaging said tooth wheel and connected to and operating said piston upon motion of said tooth wheel, and a stationary end cover having a flexible, adjustable part and being disposed at one extreme end of each cylinder for making minor adjustments of the interior volume of said cylinders.

HANS JULIUS KEITEL.